(12) United States Patent
Blaschke et al.

(10) Patent No.: US 9,461,952 B2
(45) Date of Patent: Oct. 4, 2016

(54) METHOD FOR PROCESSING MESSAGES

(75) Inventors: Volker Blaschke, Ludwigsburg (DE);
Juergen Schirmer, Heidelberg (DE);
Timo Lothspeich, Gerlingen (DE);
Tobias Lorenz, Schwieberdingen (DE);
Clemens Schroff, Kraichtal (DE)

(73) Assignee: ROBERT BOSCH GMBH, Stuttgart (DE)

( * ) Notice: Subject to any disclaimer, the term of this patent is extended or adjusted under 35 U.S.C. 154(b) by 331 days.

(21) Appl. No.: 13/698,341

(22) PCT Filed: Apr. 15, 2011

(86) PCT No.: PCT/EP2011/056035
§ 371 (c)(1),
(2), (4) Date: Jan. 25, 2013

(87) PCT Pub. No.: WO2011/147642
PCT Pub. Date: Dec. 1, 2011

(65) Prior Publication Data
US 2013/0138750 A1 May 30, 2013

(30) Foreign Application Priority Data
May 27, 2010 (DE) .................. 10 2010 029 346

(51) Int. Cl.
*H04L 12/58* (2006.01)
*G06F 15/16* (2006.01)
*H04L 12/40* (2006.01)

(52) U.S. Cl.
CPC ......... *H04L 51/18* (2013.01); *H04L 12/40032* (2013.01); *H04L 2012/40273* (2013.01)

(58) Field of Classification Search
CPC ...................................................... H04L 51/18
USPC ........................................................ 709/206
See application file for complete search history.

(56) References Cited

U.S. PATENT DOCUMENTS

| | | | |
|---|---|---|---|
| 6,381,648 B1 * | 4/2002 | Broberg, III ......... | H04L 12/413 709/232 |
| 2004/0010545 A1 | 1/2004 | Pandya | |

(Continued)

FOREIGN PATENT DOCUMENTS

| | | |
|---|---|---|
| CN | 1745367 | 3/2006 |
| CN | 100391175 | 5/2008 |

(Continued)

OTHER PUBLICATIONS

International Search Report for PCT/EP2011/056035, dated Aug. 19, 2011.
RadCom: "Radcommentation: How to Use the Performer Analyzer on MPLS Networks," Internet Article, Nov. 2004, pp. 1-7. http://networkquality.ru/files/RADCOMMENDATION_MPLS.PDF.

*Primary Examiner* — Suraj Joshi
(74) *Attorney, Agent, or Firm* — Norton Rose Fulbright US LLP

(57) ABSTRACT

In a method for processing messages with the aid of at least one Ethernet controller having a message store, the at least one Ethernet controller checks a received message for the presence of at least one property, and the received message is stored in the message store if this at least one property applies to the message.

7 Claims, 6 Drawing Sheets

(56) References Cited

U.S. PATENT DOCUMENTS

| | | |
|---|---|---|
| 2004/0093411 A1 | 5/2004 | Elzur et al. |
| 2004/0172494 A1 | 9/2004 | Pettey et al. |
| 2006/0039342 A1 | 2/2006 | Frank et al. |
| 2007/0174684 A1 | 7/2007 | Englert et al. |
| 2008/0162800 A1* | 7/2008 | Takashige ............. G06F 9/5077 711/104 |
| 2009/0265057 A1* | 10/2009 | Chinnadurai .......... G07C 5/085 701/31.4 |

FOREIGN PATENT DOCUMENTS

| | | |
|---|---|---|
| DE | 101 43 356 | 3/2003 |
| JP | 2005-159769 | 6/2005 |
| JP | 2007-135107 | 5/2007 |
| WO | WO 2005/064 546 | 7/2005 |

* cited by examiner

Fig. 6 142

| 0 | 4 | 8 | 12 | 16 | 20 | 24 | 28 | 31 |
|---|---|---|----|----|----|----|----|----|
| 144 | 146 | 148 | | 150 | | | | |
| 152 | | | | 154 | 156 | | | |
| 158 | | 160 | | 162 | | | | |
| 164 | | | | | | | | |
| 166 | | | | | | | | |
| 168 | | | | | | | | |

Fig. 7 170

| 0 | 4 | 8 | 12 | 16 | 20 | 24 | 28 | 31 |
|---|---|---|----|----|----|----|----|----|
| 172 | 174 | | 176 | | | | | |
| 178 | | | | 180 | | 182 | | |
| 184 | | | | | | | | |
| 186 | | | | | | | | |

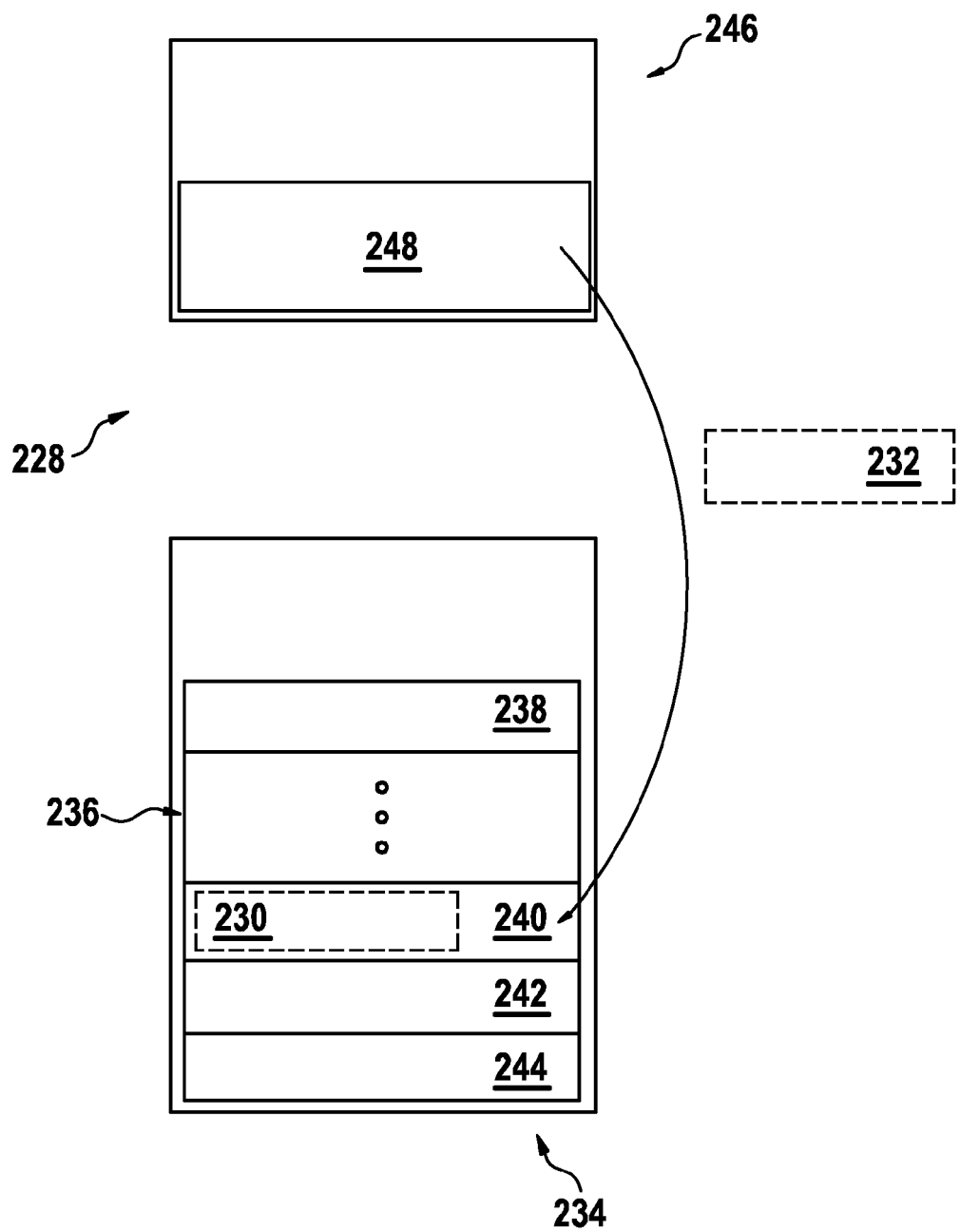

METHOD FOR PROCESSING MESSAGES

BACKGROUND OF THE INVENTION

1. Field of the Invention

The present invention relates to a method and a system for processing messages.

2. Description of the Related Art

The so-called Ethernet technology, among others, is used to transmit data packets in wired networks such as LANs. Ethernet is a network for data processing which may include multiple data processing systems. Control modules, i.e., Ethernet controllers, which are used are generally designed to receive various pieces of information via data packets and relay same to software drivers of devices for processing. A software driver is designed to evaluate a message and copy it from the receive memory of the Ethernet controller into another internal memory. This process is computationally intensive, and results in unnecessarily long processing times.

In contrast, communication controllers for commonly used field bus systems such as CAN or FlexRay, for example, and having a message store are used in a motor vehicle. Each memory space in this message store is used to process a specific message which may include, among other things, an operating parameter of the motor vehicle such as the engine speed or the vehicle speed. The message is pre-analyzed and automatically stored in hardware. The software may access the most recently received data item at any time, if necessary. Older messages are overwritten by current messages.

BRIEF SUMMARY OF THE INVENTION

The Ethernet controller provided within the scope of the present invention, i.e., a control unit or a control module for a network in which data packets are transmitted using Ethernet technology, includes a message store. This Ethernet controller is therefore typically suited for applications in closed networks having a fixed message configuration.

The Ethernet controller, which may also be referred to as an Ethernet control unit, receives a message as a data packet and checks it for certain properties which are defined in advance in the message store. If the certain, relevant properties apply to the received message, it is stored at an appropriate location in the message store. For a message having a certain content, only a certain location, i.e., a memory space, which is reserved for this message and in which this message is stored, may be provided for this message. An association of the message with the memory space is a function, among other things, of which at least one operating parameter is contained in the message. Accordingly, only messages having this at least one operating parameter are stored in the memory spaces which are reserved for the at least one certain operating parameter.

Commonly used software may have dedicated access at any time to the most recently received message. More recent messages automatically overwrite older messages. The vehicle speed, for example, may be considered to be the operating parameter.

In one embodiment of the present invention, it may be provided that a message has at least one operating parameter with the aid of which the at least one property of this message is established. An operating parameter of the motor vehicle generally has a certain value. Values of an operating parameter typically change during operation of the motor vehicle.

In another embodiment of the present invention, a first message whose at least one property is defined by at least one operating parameter has a first value of this at least one operating parameter. A second message whose at least one property is defined by the same at least one operating parameter as for the first message has a second value of this at least one operating parameter. During an update operation it is provided that the older, first message is replaced by the more recent, second message. Thus, the value of the at least one operating parameter changes within the message store.

If it is provided that a control unit sends a message via the software, the message is addressed to the appropriate space in the message store, and the transmission is initiated.

This initiation usually takes place as the result of an appropriate write operation in the send register of a communication controller. In the embodiment, sending of this message may be automatically initiated, even immediately after each modification, and thus, for example, after a message has been updated. This functionality is indirectly comparable to mirroring of a message on two or more communication controllers which communicate with one another.

If a processor changes the message, i.e., the content of the message, so that the second message results from the first message, the second message may be automatically transmitted, and all other memory spaces in the message store may be appropriately updated. To maintain consistency in the message store, the communication controllers usually have an input buffer memory and an output buffer memory, with the aid of which messages may be requested and provided by the communication controller. However, it is also conceivable to place the message store of the Ethernet controller directly in an address space of the processor in order to allow direct access. "Memory mapping" may thus be carried out.

With the aid of the method, the load on the software may be significantly reduced, since the Ethernet controller itself evaluates the messages and appropriately stores them. In the methods according to the related art, the software must initially evaluate these messages in the protocol stack, and thus evaluate multiple layers in the OSI model, and, finally, copy the message to the appropriate space. In one specific embodiment of the method according to the present invention, a dwell time or a latency time of the messages may thus be reduced. In addition, a central computing unit (CPU) of the Ethernet controller is relieved of the load and may be used for other tasks.

The system according to the present invention is designed to carry out all steps of the presented method. Individual steps of this method may also be carried out by individual components of the system. Furthermore, functions of the system or functions of individual components of the system may be implemented as steps of the method. It is also possible to implement steps of the method as functions of at least one component of the system or of the entire system.

Further advantages and embodiments of the present invention result from the description and the appended drawings.

It is understood that the features stated above and to be explained below may be used not only in the particular stated combination, but also in other combinations or alone without departing from the scope of the present invention.

BRIEF DESCRIPTION OF THE DRAWINGS

FIG. 6 shows a schematic illustration of a design of an IPV4 frame, and thus, of a frame for a data packet, as used, for example, in Internet Protocol Version 4.

FIG. 7 shows a schematic illustration of an IPV6 frame which is used, for example, in Internet Protocol Version 6.

FIG. 10 shows a schematic illustration of one specific embodiment of a system according to the present invention.

DETAILED DESCRIPTION OF THE INVENTION

Figure 1:
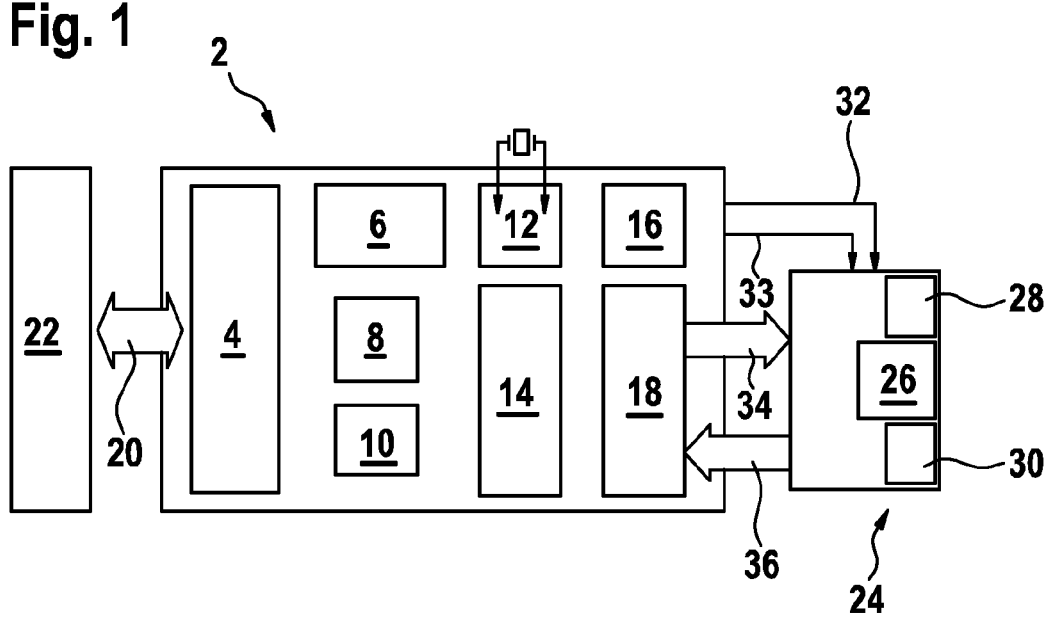
FIG. 1 shows a schematic illustration of an Ethernet controller known from the related art.

The present invention is schematically illustrated based on specific embodiments in the drawings, and is described in greater detail below with reference to the drawings.

The figures are described in an interrelated and all-encompassing manner, with identical components being denoted by the same reference numerals.

Conventional Ethernet controller 2 schematically illustrated in FIG. 1 includes a host interface 4, and thus an interface with a database provider, an 8 kB user flash 6, i.e., a digital memory chip, a 2 kB Tx buffer 8, i.e., a buffer memory, for transmitting messages, a 4 kB Rx first in, first out (FIFO) buffer 10 for receiving messages, a clock 12, which in the present case is operated at a frequency of 20 MHz, an Ethernet media access controller (MAC) 14 for controlling access to a media address, a control display 16 (LED control), and a physical layer 18 (Ethernet PHY).

Interface 4 of Ethernet controller 2 is connected to a microcontroller 22 (MCU) of the data provider (host) via a parallel bus connection 20. FIG. 1 also shows a module 24 having a chip 26 (RJ-45), as well as a light-emitting diode 28 designed as an ACT LED and a light-emitting diode 30 designed as a LINK LED which are connected to a control display 16 via supply lines 32, 33 for the LINK LED and the ACT LED. In addition, it is provided that physical layer 18 sends messages to module 24 via a transmission path 34 and receives messages from module 24 via a reception path 36.

Figure 2:
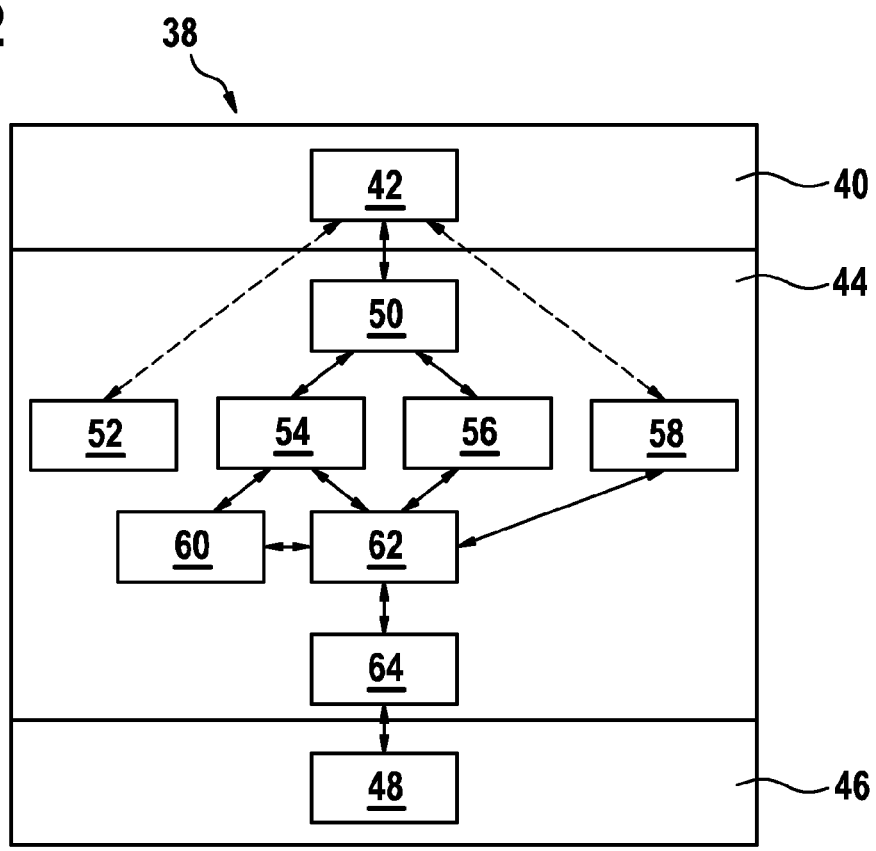
FIG. 2 shows a schematic illustration of a block diagram of a so-called TCP/IP stack.

FIG. 2 shows a schematic illustration of a block diagram of a TCP/IP stack, and thus, a stack memory 38 for a Transmission Control Protocol/Internet Protocol. This stack memory 38 includes a user area 40 having an application 42, a core 44, and hardware 46 which includes a network adapter 48.

Core 44 has a TCP/UDP network protocol 50 (UDP=User Datagram Protocol), a module 52 for controlling Internet messages according to Internet Protocol Version 4 (ICMPv4 IGMP), a module 54 which includes Internet Protocol Version 4, a module 56 which includes Internet Protocol Version 6, and a module 58 for controlling Internet messages according to Internet Protocol Version 6 (ICMPv6). In addition, core 54 includes a module 60 for a further network protocol (Address Resolution Protocol (ARP)), a module 62 having a link layer, and a module 64 for a device driver.

After a message is received, it is processed by host MCU 22 (FIG. 1). For this purpose, the message runs through an Ethernet driver and stack memory 38 (TCP/IP stack) (FIG. 2). Only then is application 42 able to process the data.

Figure 3:
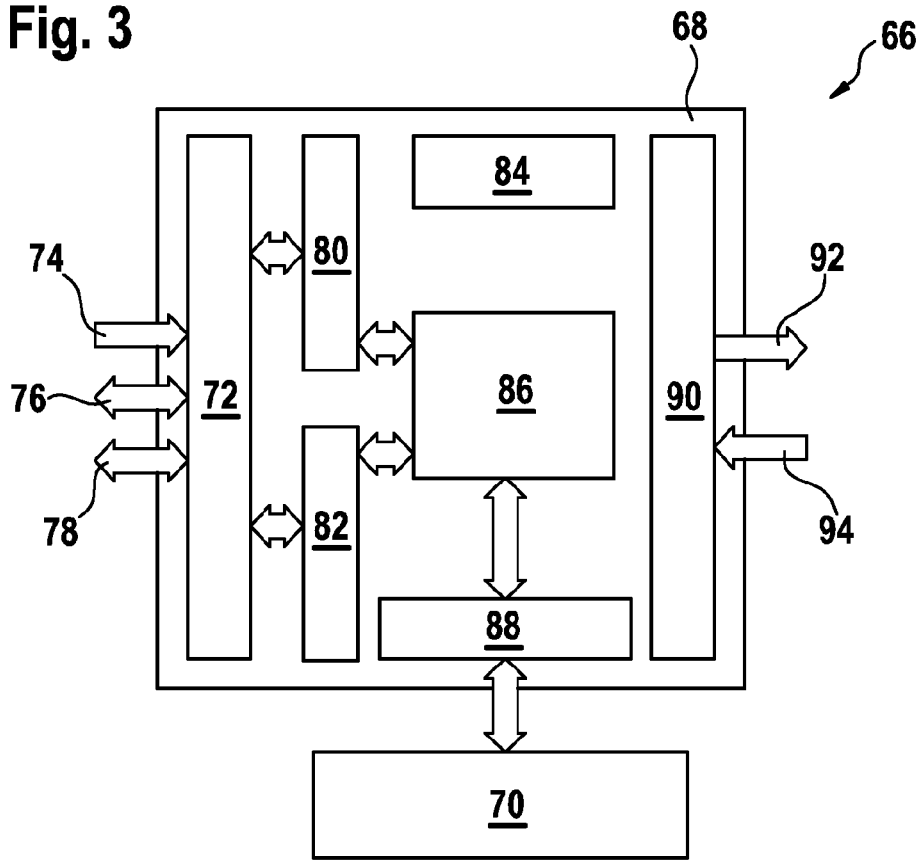
FIG. 3 shows a schematic illustration of one example of a communication controller known from the related art, which is usually used in a motor vehicle.

FIG. 3 shows a schematic illustration of a communication controller 66 which is used as related art, for example in a network (controller area network (CAN)) of a motor vehicle. This communication controller 66 includes a driver 68 (bus CLK) and a message store 70, which in the present case is designed as RAM and includes a buffer for 32 messages as well as a memory space having 136×32 bits.

Driver 68 includes an interface 72 which is designed to receive addresses 74 and to exchange data 76 and control instructions 78 with other devices. In addition, driver 68 includes a first decision module 80 (IF CON REG 1) and a second decision module 80 (IF CON REG 2). Furthermore, driver 68 has a register 84, a module 86 for processing messages, and a control unit 88 for controlling message store 70. A core 90 (CAN core) is designed to send messages to a CAN bus via a transmission path 92 (CAN Tx) and to receive messages from the CAN bus via a reception path 94 (CAN Rx).

Communication controller 66 shown here, which has message store 70 and is usable in a motor vehicle, includes information that is necessary for receiving and transmitting a message, and in message store 70 includes an area in which the associated useful data of the messages are stored. For CAN controllers, this information includes the transmission direction, message identification, and a message mask, for example. For FlexRay, information concerning the chronological position in the communication time schedule is also stored.

Since when data packets are transmitted according to the Ethernet technology, the transmission goes beyond the second OSI layer (Ethernet), and the third layer (IPv4/IPv6) and the fourth layer (TCP/UDP) may also be used, much more information may be required, depending on the configuration level.

Figure 4:
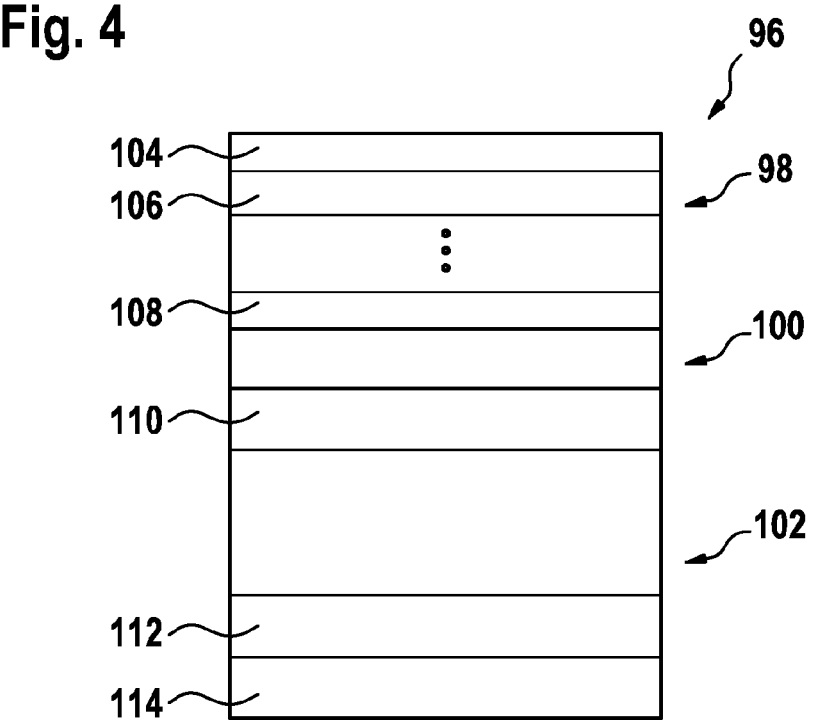
FIG. 4 shows a schematic illustration of a message store which may be used in one specific embodiment of an Ethernet controller according to the present invention.

FIG. 4 shows a schematic illustration of one specific embodiment of a message store 96 which may be used as a component of an Ethernet controller as used in one possible specific embodiment of the present invention. Message store 96 includes a first area 98 for header data of a data packet, a second, unused area 100, and a third area 102 for useful data of the data packet. First area 98 includes a first memory space 104 for header data of a first message, a second memory space 106 for header data of a second message, and an nth memory space 108 for header data of an nth message. The third area includes a first memory space 110 for useful data of the first message, a second memory space 112 for useful data of the data packet, and an nth memory space 114 for useful data of the nth message. It makes no difference whether the information for processing the messages and the useful data of the message are present in separate areas 98, 102 of message store 96 as shown here, or in each case are stored together in one block. Message store 98 is usually separated when the size of the header data differs greatly from the size of the useful data of the messages. This is typically the case for the Ethernet. For CAN, on the other hand, the useful data always directly follow the associated header data, which include processing information, among other things.

Figure 5:
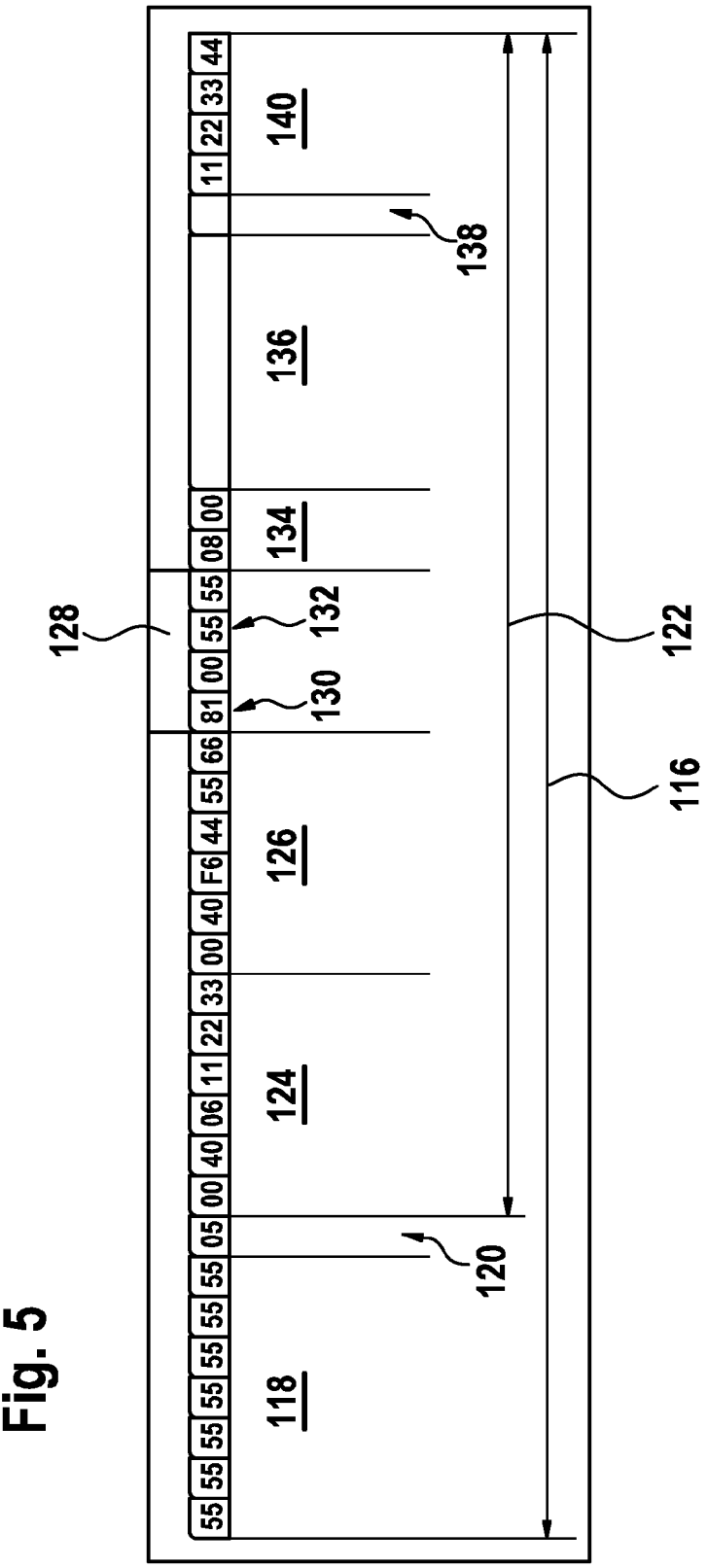
FIG. 5 shows a schematic illustration of one example of an Ethernet frame.

FIG. 5 shows a schematic illustration of one example of an Ethernet package 116 which includes a preamble having a length of 7 bytes and a stack frame delimiter (SFD) 120 having a length of 1 byte. An Ethernet frame 122 includes a destination MAC address 124 and a source MAC address 126, each having a length of 6 bytes. A Virtual Local Area Network (VLAN) tag 128 has a length of 7 bytes, and includes a TPID 130 and a TCI 132. Ethernet frame 122 also includes a type field 134 as well as data 136 having a length between 0 and 1500 bytes. Furthermore, Ethernet frame 122 includes a PAD padding field 138 and a CRC checksum 140.

When data are transmitted using the Ethernet technology, in the simplest case only information concerning second layer OS/layer 2 (Ethernet) is necessary. The mentioned message information for transmitting and receiving in the message store may be deduced from Ethernet frame 122 in FIG. 5.

FIG. 6 shows a schematic illustration of one example of a header data area 142 designed as an IPv4 header data area, and thus, a header as used in Internet Protocol Version 4 (IPv4), as the introduction in a data packet (frame) for a message to be sent.

This header data area 142, having a width of 32 bits, includes a piece of information concerning a version 144 of header data area 142, having a width of 4 bits, a piece of information concerning a length 146 of the data packet, having a width of 4 bits, this length 146 also being referred to as IHL (short for IP header length), a piece of information concerning a type of service (TOS) 148, having a width of 8 bits, and a piece of information concerning a total length 150 of the data packet, having a width of 16 bits.

Header data area 142 also includes an identifier 152 having a width of 16 bits, a control switch 154 (flag) having a width of 3 bits, and information concerning fragmentation 156 (fragment offset), having a width of 13 bits. Information concerning time to live (TTL) 158 of the data packet, having a width of 8 bits, information concerning Internet protocol 160 used within the scope of the embodiment of the present invention, having a width of 8 bits, and a checksum 162 having a width of 16 bits are also provided here. According to Internet Protocol 160 Version 4, header data area 21 illustrated here also includes a piece of information concerning a source address 164, a destination address 166, and optionally at least one piece of information concerning further options 168, each having a width of 32 bits.

FIG. 7 schematically illustrates header data area 170 for a data packet (frame) for a message according to Internet Protocol Version 6 (IPv6). This header data area 170, designed as an IPv6 header data area, includes a piece of information concerning a version 172, having a width of 4 bits, a piece of information concerning a priority allocation 174 (traffic class), having a width of 8 bits, a piece of information concerning a flow value 176 (flow label), having a width of 20 bits, a piece of information concerning a length 178 of a content of the data packet designed as an IPv6 data packet, having a width of 16 bits, a piece of information concerning identification 180 of a subsequent header data area, having a width of 8 bits, and a piece of information concerning a maximum number of intermediate steps 182 (hop limit) which the associated data packet may cover over a router, having a width of 8 bits. In addition, header data area 170 shown includes a source address 184 and a destination address 186, each having a width of 128 bits.

The versions for header data areas 142, 170 shown in FIGS. 6 and 7 are used for the IP protocol on a third OS/layer. The shown information for transmitting and receiving of messages may be deduced therefrom.

Figure 8:
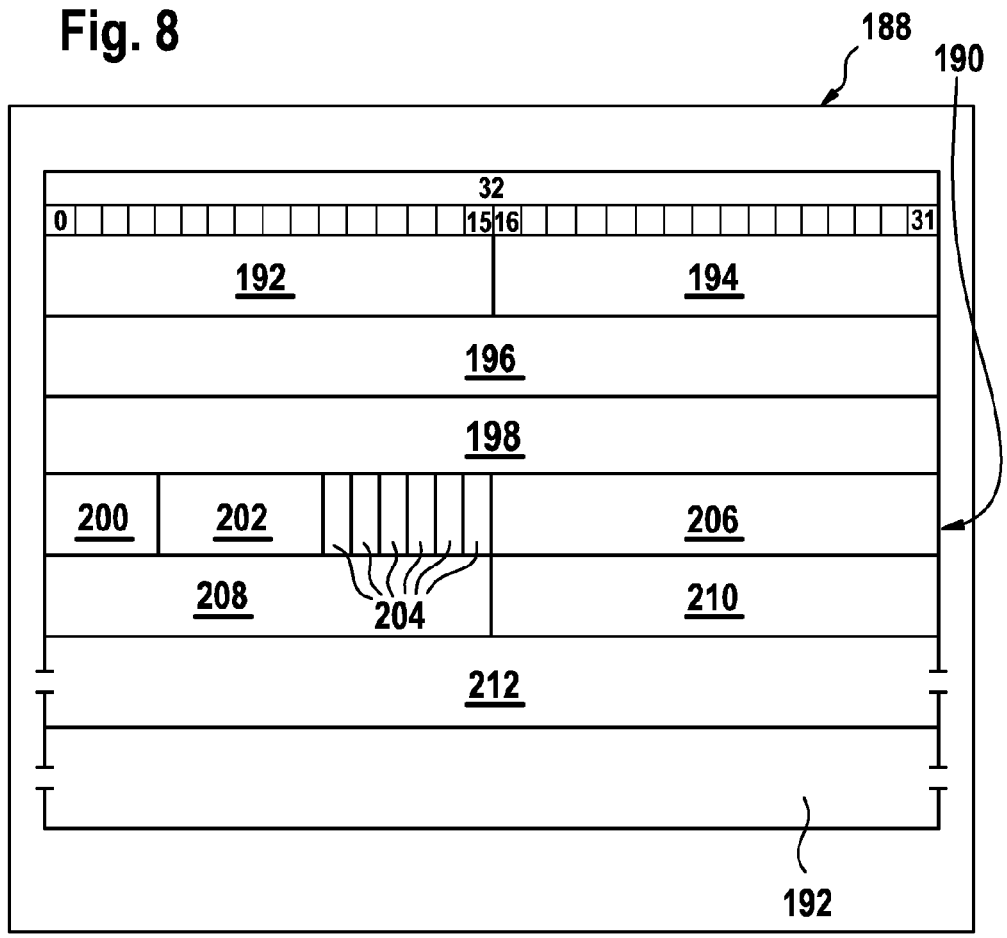
FIG. 8 shows a schematic illustration of one example of a TCP frame.

FIG. 8 shows a schematic illustration of a frame 188 as used in a TCP protocol. Frame 188 includes a TCP header data area 190 and an area 192 for data to be transmitted.

Header data area 190 includes information concerning a source connection 192, information concerning a destination connection 194, information concerning a sequence number 196, and information concerning a receipt confirmation 198. In addition, header data area 190 includes a data offset 200, a reserved area 202, multiple control variables 204, a window 206, a checksum 208, a precedence indicator 210, and information concerning further options 212, having a number of 32-bit words.

Figure 9:
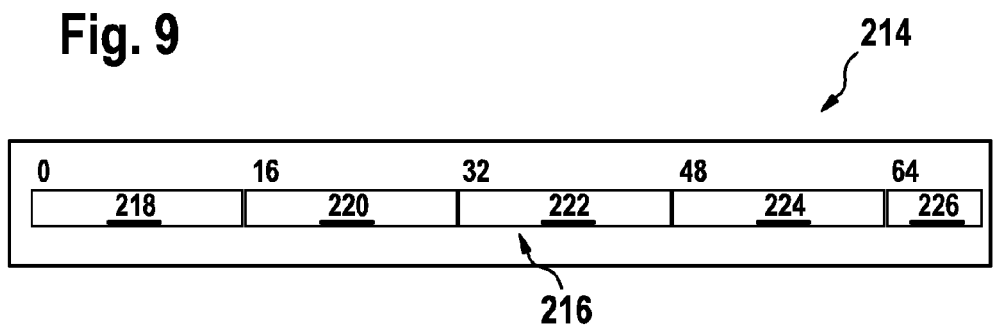
FIG. 9 shows a schematic illustration of one example of a UDP frame.

The UDP frame schematically illustrated in FIG. 9, as used for a user datagram protocol (UDP), includes a UDP data packet 216, and information concerning a source connection 218, information concerning a destination connection 220, information concerning a length 222, and information concerning a checksum 224, as well as data 226.

TCP frame 188 (FIG. 8) and UDP frame 214 (FIG. 9) thus respectively contain the information shown, for example concerning source connection 192, 218, destination connection 180, 225, or length 222. It should be noted here that when TCP information is processed, the instantaneous protocol state, for example of the message counter, must be taken into account. The UDP protocol is stateless, and in one specific embodiment of the method according to the present invention may be processed due to the low degree of complexity.

The specific embodiment of a system 228 according to the present invention for processing messages 230, 232, schematically illustrated in FIG. 10, has an Ethernet controller 234, and thus, a control unit for messages which are transmitted as data packets using the Ethernet technology, and has a message store 236 which includes a number of memory spaces 238. Ethernet controller 236 checks a received message 230, 232 for the presence of at least one property, and if this at least one property applies to message 230, 232, stores received message 230, 232 in a memory space 238, 240, 242, 244 of message store 236 reserved for messages 230, 232.

System 228 also includes a communication controller 246 having a send register 248, communication controller 246 being designed to send a message 230, 232 after carrying out a write operation within send register 248.

The specific embodiment of system 228 according to the present invention described here is situated in a network inside a motor vehicle, and is designed to transmit messages 230, 232, which as at least one property have a value of at least one operating parameter of the motor vehicle. Accordingly, at least one property of message 230, 232 is defined by the at least one operating parameter.

In the operating situation shown with reference to FIG. 10, it is provided that a first message 230 is already present in a memory field 240 of message store 236. This first message 230 includes a first value of the at least one operating parameter. In addition, the value of the at least one operating parameter is changed during ongoing operation of the motor vehicle. However, the at least one operating parameter, and thus also the at least one property of message 230, 232, does not change due to the resulting change in the value. Second message 232 transmitted by communication controller 246 includes a second, updated value of the at least one operating parameter. As soon as second message 232 has reached Ethernet controller 234, second message 232 is stored at memory space 240 in which first message 230 is already present, as the result of which first message 230 is also overwritten by second message 232. This results in updating of the value of the at least one operating parameter within message store 236.

What is claimed is:

1. A method for processing electronic messages for a motor vehicle, the method comprising:
checking, using at least one Ethernet controller having a message storage, a first received message to determine whether the first received message includes at least one predefined property;
storing the first received message in the message storage responsive to the determination being that the first received message includes the at least one predefined property, wherein the first received message includes a value of at least one operating parameter of the motor vehicle, and the at least one property is defined by the at least one operating parameter;
checking, using the at least one Ethernet controller having the message storage, a second received message to determine whether the second received message includes the same at least one predefined property; and
overwriting the first received message in the message storage with the second received message responsive to the determination being that the second received message includes the same at least one predefined property.

2. The method as recited in claim 1, wherein the first and second received messages are sent from at least one communication controller.

3. The method as recited in claim 2, wherein the first and second received messages are sent within a network using an Internet protocol.

4. A system for processing messages, the system being situated in a motor vehicle and comprising:
an Ethernet controller which has a message storage, wherein:
the at least one Ethernet controller is configured to:
(i) check at least one first received message to determine whether the first received message includes at least one predefined property;
(ii) store the first received message in the message storage responsive to the determination being that the first received message has the at least one predefined property;
(iii) check at least one second received message to determine whether the second received message includes the same at least one predefined property; and
(iv) overwrite the first received message in the message storage with the second received message responsive to the determination being that the second received message has the same at least one predefined property;
the first received message includes a value of at least one operating parameter of the motor vehicle; and
the at least one predefined property is defined by the at least one operating parameter.

5. The system as recited in claim 4, wherein the message storage has multiple memory spaces, and wherein one memory space is reserved for a message which has the at least one property.

6. The system as recited in claim 5, further comprising:
a communication controller which has a send register, wherein the communication controller is configured to send a message to the Ethernet controller after a write operation is carried out by the send register.

7. The system as recited in claim 5, wherein the system is configured to exchange messages from a network situated in the motor vehicle.

* * * * *